(12) United States Patent
Misawa et al.

(10) Patent No.: US 6,260,988 B1
(45) Date of Patent: Jul. 17, 2001

(54) VEHICLE EXTERIOR LAMP

(75) Inventors: Akihiro Misawa; Hisao Yamaguchi; Tadanobu Iwasa; Hiroshi Ito, all of Ichinomiya (JP)

(73) Assignee: Toyoda Gosei Co., Ltd., Nishikausugai-gun (JP)

( * ) Notice: Subject to any disclaimer, the term of this patent is extended or adjusted under 35 U.S.C. 154(b) by 0 days.

(21) Appl. No.: 09/206,384

(22) Filed: Dec. 7, 1998

(30) Foreign Application Priority Data

Dec. 5, 1997 (JP) ...................................................... 9-334710

(51) Int. Cl.⁷ ......................................................... F21S 8/10

(52) U.S. Cl. ........................... 362/276; 362/494; 362/464; 362/545

(58) Field of Search ..................................... 362/276, 459, 362/464, 487, 495, 500, 501, 505, 506, 509, 510, 513, 540

(56) References Cited

FOREIGN PATENT DOCUMENTS 8-11632    1/1996   (JP) .

*Primary Examiner*—Sandra O'Shea
*Assistant Examiner*—David V. Hobden
(74) *Attorney, Agent, or Firm*—Pillsbury Winthrop LLP

(57) ABSTRACT

Provided a vehicle exterior lamp capable of illuminating the ground surrounding a vehicle. When returning to a predetermined position of a parking lot, a road or the like where a vehicle has been parked, a switch of a transmitter is operated. By doing so, the vehicle is illuminated in a predetermined color and a selected mode, and the vicinity of a door of the vehicle is illuminated by this light, so that the condition of the ground can be confirmed. Particularly, the color of the light, emitted from a light-emitting source, can be arbitrarily set, and the setting can be made, taking the brightness and the saving of the energy into consideration. Even if discriminating information, such as a code, is not provided between the transmitter and a receiver, the color of the illumination of the vehicle can be discriminated from that of other vehicles.

6 Claims, 5 Drawing Sheets

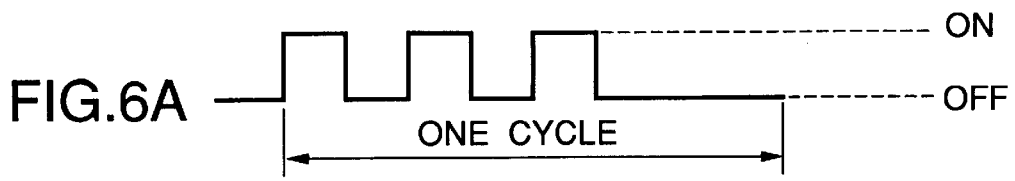
FIG.6A
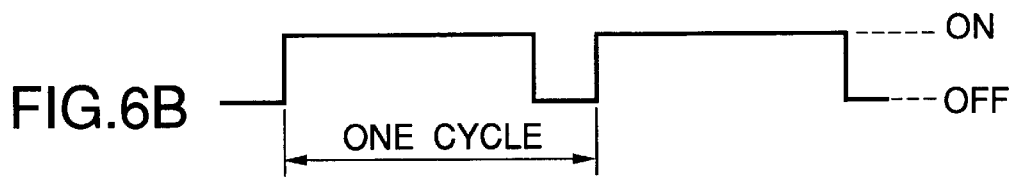
FIG.6B
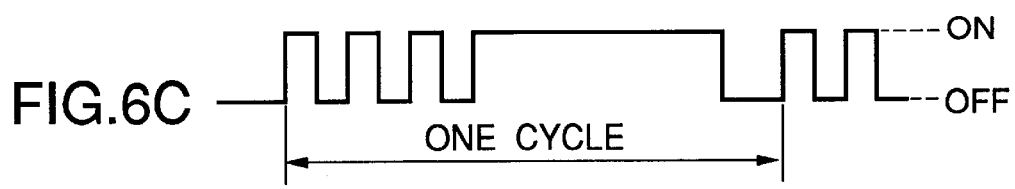
FIG.6C
FIG.7
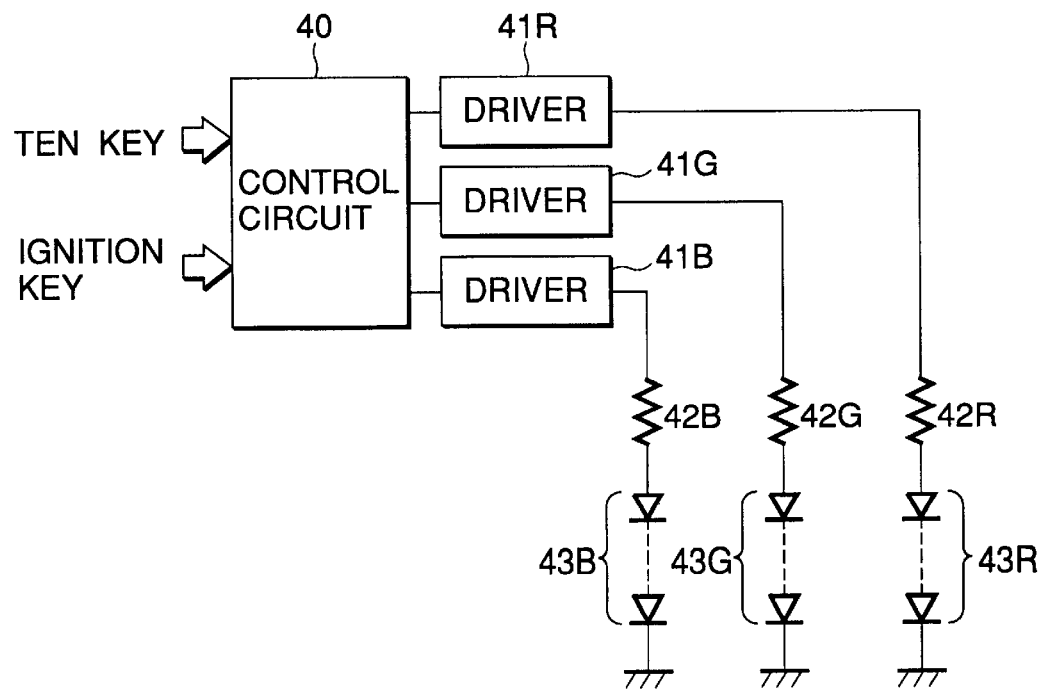

VEHICLE EXTERIOR LAMP

BACKGROUND OF THE INVENTION

1. Field of the Invention

This invention relates to a vehicle exterior lamp for illuminating the ground in the vicinity of an associated vehicle at night.

2. Description of the Related Art

In a parking lot and a road with which one is unfamiliar, there is a possibility that, when getting on a vehicle, a persons foot may get caught by a muddy spot or puddle on the ground.

Even if a driver parks the car, taking into consideration the condition of the ground onto which passengers must step, the road surface beneath one or more of the four doors of the car will be changed if rain falls later, and forms a puddle.

Japanese Utility Model Publication No. Hei. 1-115948 discloses a technique in which the road surface is illuminated when getting down from a car. The technique, disclosed in this publication, is directed to a technique of illuminating the ground at the passenger's feet when the door is opened. However, before the passenger, who has come back to the car, opens the door, the road surface in the vicinity of the car can not be illuminated, and therefore if rain falls after the car is parked, the condition of the road surface is changed, so that a puddle is formed in the road surface, there is a possibility that the passenger places a foot in the puddle.

Particularly in the case of a recreational vehicle or the like, there is a possibility that the passenger may not properly place his foot on a side step. Japanese Patent Publication No. Hei. 8-11632 discloses a technique of illuminating a side step of a recreational vehicle or the like. However, the technique, disclosed in this publication, is limited to the illumination of the side step, and there is no disclosure of the illumination of the exterior of the car, and particularly the illumination of the ground.

SUMMARY OF THE INVENTION

It is therefore an object of this invention to provide a vehicle exterior lamp capable of illuminating at least the ground around a vehicle when getting on the vehicle.

According to one aspect of the present invention, there is provided a vehicle exterior lamp comprising a light-emitting source mounted on a vehicle for illuminating a ground location from the vehicle; also included is a transmitter for outputting predetermined electromagnetic waves; and a receiver responsive to the predetermined electromagnetic waves from the transmitter so as to drive and control the light-emitting source.

In the above vehicle exterior lamp, the transmitter for outputting the predetermined electromagnetic waves can be a personal handy phone system (PHS).

In the above vehicle exterior lamp, the transmitter for outputting the predetermined electromagnetic waves can be a transmitter of a keyless entry system.

According to another aspect of the invention, there is provided a vehicle exterior lamp comprising: a light-emitting source mounted on a vehicle for illuminating the ground from the vehicle; and a timing control circuit for changing a color of light, emitted from the light-emitting source, with the lapse of predetermined time.

BRIEF DESCRIPTION OF THE DRAWINGS

In the accompanying drawings:

FIGS. 6A to 6C are timing charts of an output of a pulse pattern generator used in the first embodiment of the vehicle exterior lamp of the invention;

FIG. 7 is a circuit diagram showing an overall construction of a second embodiment of a vehicle exterior lamp of the invention.

DESCRIPTION OF THE PREFERRED EMBODIMENTS OF THE INVENTION

A preferred embodiment of the present invention will now be described.

Figure 1:
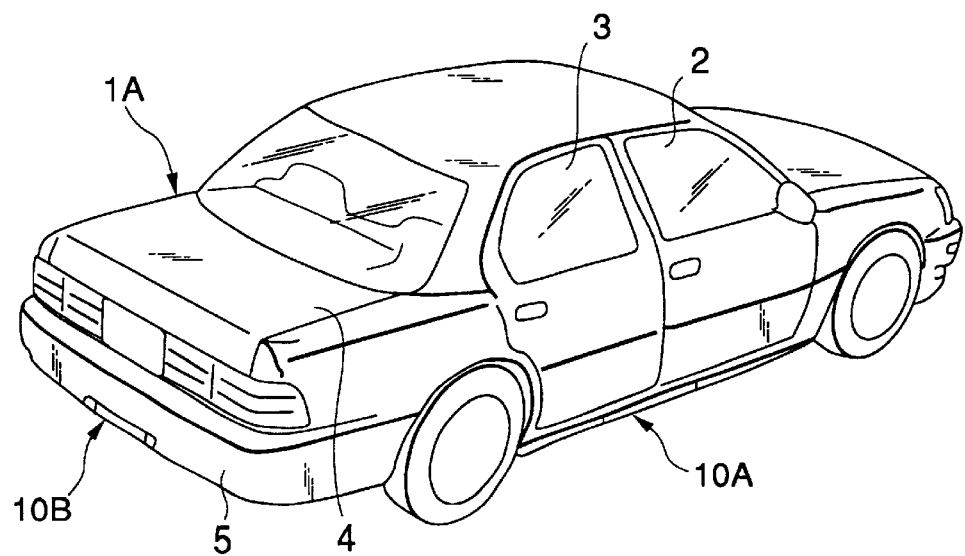
FIG. 1 is a perspective view of the whole of a vehicle as seen from its rear side, showing the positions of mounting of light-emitting sources in a first embodiment of a vehicle exterior lamp of the present invention.
Figure 2:
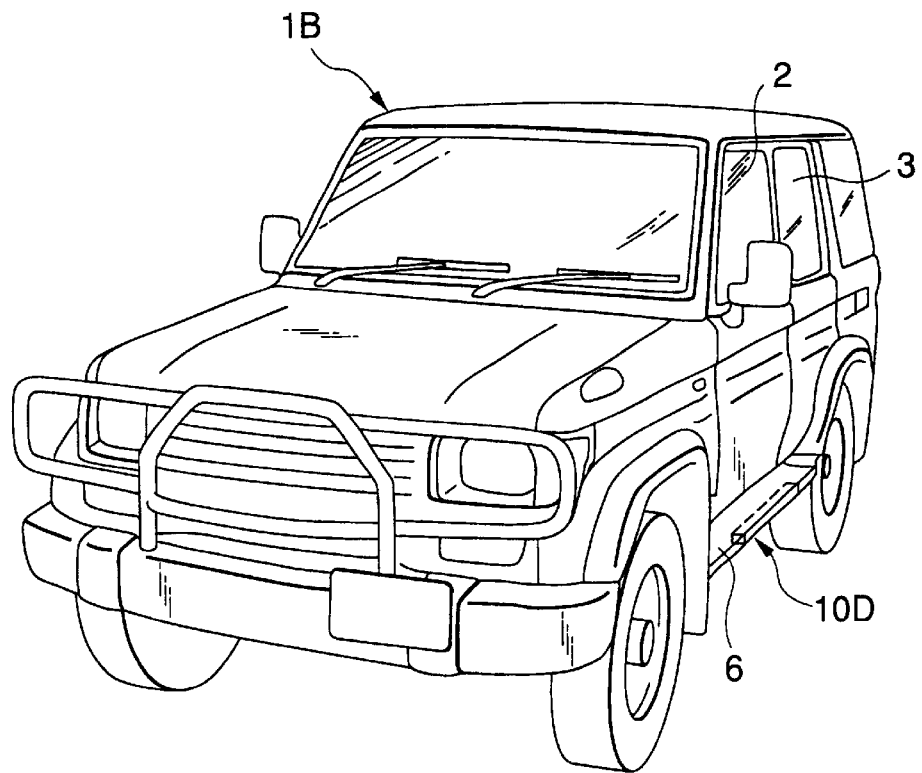
FIG. 2 is a perspective view of the whole of a recreational vehicle as seen from its front side, showing the position of mounting of a light-emitting source in the first embodiment of the vehicle exterior lamp of the invention.
Figure 3:
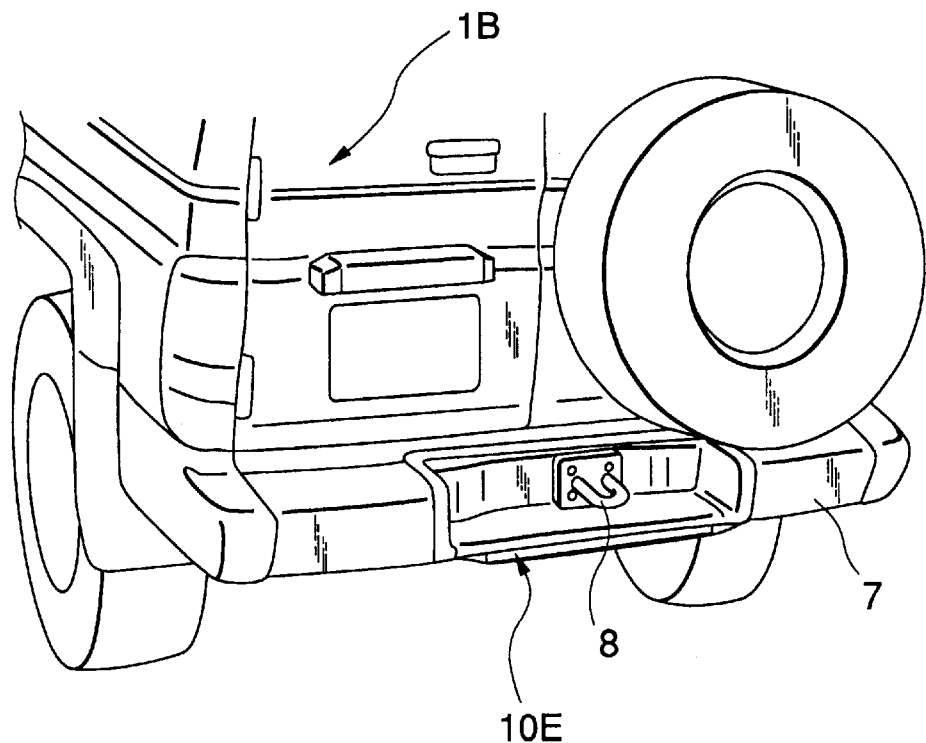
FIG. 3 is a perspective view of a main portion of the recreational vehicle as seen from its rear side, showing the position of mounting of a light-emitting source in the first embodiment of the vehicle exterior lamp of the invention.
Figure 4:
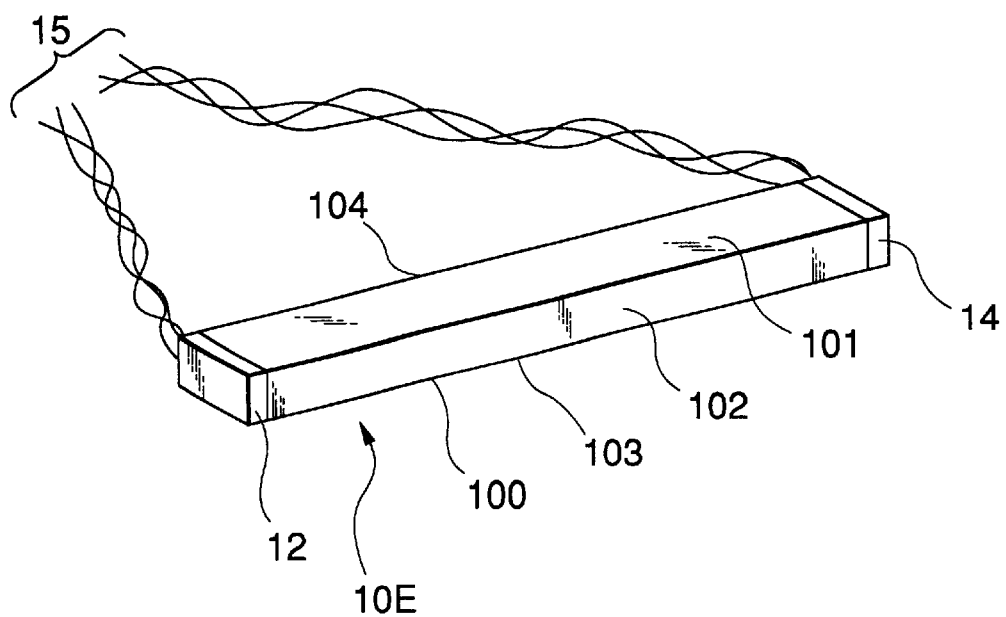
FIG. 4 is a perspective view of a main portion of the rib light-emitting source of the first embodiment of the vehicle exterior lamp of the invention.

FIG. 1 is a perspective view of the whole of a vehicle as seen from its rear side, showing the positions of mounting of light-emitting sources according to a first embodiment of a vehicle exterior lamp of the present invention, FIG. 2 is a perspective view of the whole of a recreational vehicle as seen from its front side, showing the position of mounting of a light-emitting source according the first embodiment of the vehicle exterior lamp of the invention, and FIG. 3 is a perspective view of a main portion of the recreational vehicle as seen from its rear side, showing the position of mounting of a light-emitting source according to the first embodiment of the vehicle exterior lamp of the invention. FIG. 4 is a perspective view of a main portion of the light-emitting source according to the first embodiment of the vehicle exterior lamp of the invention.

In FIG. 1, as is well known, the vehicle 1A has front doors 2 and rear doors 3. A recess is formed in a portion of a sill provided beneath the front door 2 and the rear door 3, and the light-emitting source 10A, comprising a photoconductive plate 100, is embedded in this recess. More specifically, the recess is formed in that portion of the sill disposed at a middle position of the front door 2 and rear door 3, and the light-emitting source 10A is embedded in this recess in such a manner that a central portion of the light-emitting source 10A is disposed generally at a position of a center pillar. Similarly, another light-emitting source is provided at the assistant driver's seat side (not shown).

A recess is also formed in a central portion of a rear bumper 5, and the light-emitting source 10B, comprising a photoconductive plate 100, is embedded in this recess. More specifically, the recess is formed in that portion of the rear bumper 5 disposed at a middle portion of a trunk lid 4, and the light-emitting source 10B is embedded in this recess.

For carrying out the present invention, the light-emitting source 10B can be embedded in a spoiler mounted on the trunk lid 4, a spoiler mounted on a roof of a recreational vehicle or the like, or a high mount stop lamp on the recreational vehicle.

In FIG. 2, a recess is formed in a lower side of a side step 6 of the vehicle 1B (such as a recreational vehicle) disposed below a front door 2 and a rear door 3, and the light-emitting source 10D, comprising a photoconductive plate 100, is embedded in this recess. More specifically, the recess is formed in the lower side of that portion of the side step 6 disposed at a middle position of the front door 2 and rear door 3, and the light-emitting source 10D is embedded in this recess. Similarly, another light-emitting source is provided at the driver's seat side (not shown).

As shown in FIG. 3, a recess is formed in a central portion of a rear bumper 7 of the vehicle 1B, and the light-emitting source 10E, comprising a photoconductive plate 100, is embedded in this recess. More specifically, the recess is formed in that portion of the rear bumper 7 disposed beneath a hook 8 provided at the central portion of the rear bumper 7, and the light-emitting source 10E is embedded in this recess.

As shown in FIG. 4, the light-emitting source 10E comprises the photoconductive plate 100, made of a light-transmissive, transparent or slightly-colored plate of a synthetic resin such as an acrylic resin and an epoxy resin, and LED lamps 12 and 14 provided respectively at opposite ends of the photoconductive plate 100. Each of the LED lamps 12 and 14 is molded into a plate-like shape, and all of the surfaces of each LED lamp except that surface thereof, bonded to the photoconductive plate 100, and light-outgoing surfaces thereof, have a reflective coating or film to form reflecting surfaces. Opposite end surfaces of the photoconductive plate 100 are transparent so as to allow the passage of light therethrough. A reflective coating or film is formed on each of an upper surface 101 and a rear surface 104 of the photoconductive plate 100 to provide a reflecting surface. A front surface 102 and a lower surface 103 are transparent, or are cut into a prismatic configuration if necessary, and serve as light-outgoing surfaces. A red LED chip 12R, a green LED chip 12G and a blue LED chip 12B are contained in the LED lamp 12, and a red LED chip 14R, a green LED chip 14G and a blue LED chip 14B are contained in the LED lamp 14, and these are bonded. The LED chips of each of the two LED lamps have independent lead wires 15, respectively, so that the red, green and blue colors can flash alone or in combination.

The photoconductive plate 100, the LED lamps 12 and 14 (each molded into a plate-like shape) provided respectively at the opposite ends of the plate 100, and the lead wires 15, which jointly constitute the light-emitting source 10E, are further molded into an integral construction, and this is mounted in the above-mentioned sill, rear bumper 5 and side step 6, and will not easily disengaged therefrom.

Figure 5:
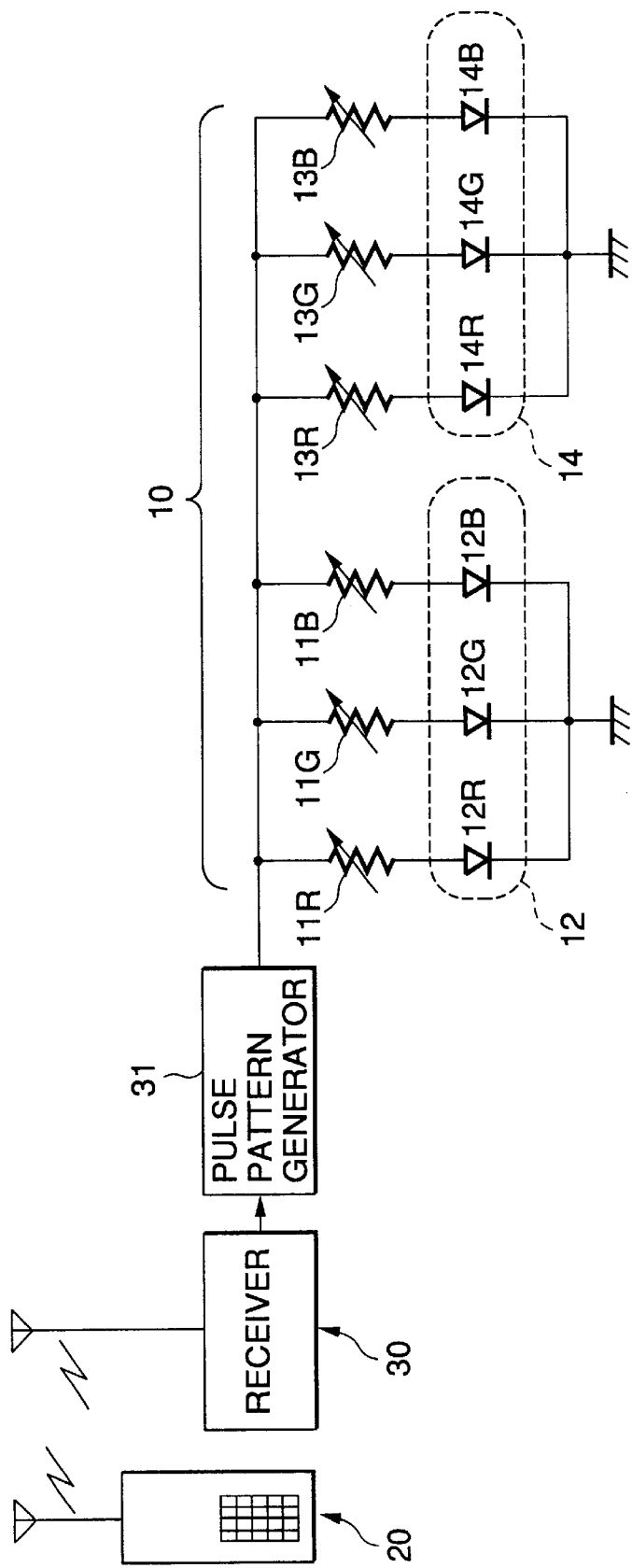
FIG. 5 is a circuit diagram showing the overall construction of the first embodiment of the vehicle exterior lamp of the invention.

FIG. 5 is a circuit diagram showing the overall construction according to the first embodiment of the vehicle exterior lamp of the invention, and FIGS. 6A to 6C show timing charts of an output of a pulse pattern generator used in the first embodiment of the vehicle exterior lamp of the invention.

In FIG. 5, a transmitter 20 for outputting predetermined electromagnetic waves is a transmitter used in a keyless entry system, a portable wireless device, or a PHS. Preferably, the transmitter can output a code or the like enabling the recognition of the self. The electromagnetic waves may be any of electric waves, visible light, a laser beam and infrared rays.

A receiver 30 is responsive to the electromagnetic waves from the transmitter 20 so as to drive and control the light-emitting source 10, and this receiver 30 recognizes the code, assigned to the self, from the electromagnetic waves outputted from the transmitter used in a keyless entry system, the portable wireless device, or the PHS, and the receiver 30, when recognizing the code assigned to the self, outputs an ON signal, an OFF signal, a pulse signal, a continuous pulse train, or a predetermined code.

The pulse pattern generator 31 is responsive to the predetermined output from the receiver 30 so as to output a train of pulses during one cycle of 30 seconds or 60 seconds (as shown in FIG. 6A), thereby causing the light-emitting source to emit light. As shown in FIG. 6B, one cycle is set to 20 seconds, 30 seconds or 60 seconds, and one pulse is outputted during one cycle so as to emit the light. Also, as shown in FIG. 6C, one cycle is set to 20 seconds, 30 seconds or 60 seconds, and a train of pulses are outputted during one cycle so as to emit the light, and for example, there is provided a mode in which the emitted light is gradually becoming brighter. A desired one of these modes can be arbitrarily set, and the number of cycles can be set to 1 to several. Namely, the length of the cycle is set by a time period from the start of lighting by the transmitter 20 to a time when it can be recognized.

The light-emitting source 10, serving as the light source, comprises a circuit constituted by the circuit of the LED lamp 12 and the circuit of the LED lamp 14 which are connected in parallel. The circuit of the LED lamp 12 comprises three independent LED chip circuits (that is, a circuit of one or more red LED chips 12R connected to a variable resistor 11R, a circuit of one or more green LED chips 12G connected to a variable resistor 11G, and a circuit of one or more blue LED chips 12B connected to a variable resistor 11B) connected in parallel. The circuit of the LED lamp 14 comprises three independent LED chip circuits (that is, a circuit of one or more red LED chips 14R connected to a variable resistor 13R, a circuit of one or more green LED chips 14G connected to a variable resistor 13G, and a circuit of one or more blue LED chips 14B connected to a variable resistor 11G) connected in parallel. In FIG. 5, an example in which each of LED chips 12R to 14B is only one is shown to simplify the drawing.

The intensity of the light, emitted from one or more red LED chips 12R, is determined by varying the resistance value of the variable resistor 1R, and the intensity of the light, emitted from one or more green LED chips 12G, is determined by varying the resistance value of the variable resistor 11G, and the intensity of the light, emitted from one or more blue LED chips 12B, is determined by varying the resistance value of the variable resistor 11B, and these three lights are determined in intensity independently of one another. Similarly, the lights, emitted respectively from one or more red LED chips 14R, one or more green LED chips 14G and one or more blue LED chips 14B can be independently determined in intensity respectively by varying the resistance values of the variable resistors 13R, 13G and 13B. Therefore, each of the illuminating LED 12 and LED 14 can be arbitrarily set to a color, containing a white color, as a whole.

The vehicle exterior lamp of the first embodiment can be used in the following manner.

The driver parks the vehicle 1A, 1B at a predetermined position of a parking lot, a road or the like, and then finishes the necessary business such as shopping, and then goes back to the parking lot, and immediately before he returns to the vehicle, he operates a switch of the transmitter 20, so that the transmitter outputs the signal of the predetermined code formed by electromagnetic waves. The receiver 30, mounted on the vehicle 1A, 1B, receives the electromagnetic waves from the transmitter 20 to recognize the predetermined code, and outputs a signal for driving and controlling the light-emitting sources 10. In response to the signal from the receiver 30, the pulse pattern generator 31 outputs the predetermined pulse pattern selected from those of FIGS. 6A to 6C. The predetermined pulse pattern, outputted from the pulse pattern generator 31, causes electric currents, determined respectively by the variable resistors 11R, 13R, the variable resistors 11G and 13G and the variable resistors 11B and 13B, to flow respectively through the red LED chips 12R and 14R, the green LED chips 12G and 14G and the blue LED chips 12B and 14B, thereby obtaining the desired illumination light. Then, the pulse pattern generator 31 is stopped upon lapse of a predetermined period, or its output is stopped when an ignition switch is operated, or when a shift lever is shifted from the P range to the D range or the R range, or when the door is opened, and then closed. One of these conditions may be selected, or all of these conditions may be selected.

Therefore, when the switch of the transmitter 20 is operated upon arrival at the predetermined position of the parking lot, the road or the like where the vehicle 1A, 1B has been parked, the vehicle 1A, 1B flashes in the predetermined color in the selected mode (this flashing light is recognized as continuous light by the naked eyes), and therefore the vicinities of the doors of the vehicle are illuminated by this color light, so that the condition of the ground can be confirmed. In the case of a recreational vehicle or the like having side steps, the positions of the side steps themselves can be confirmed, and this prevents the passenger from missing his foot on the side step. Particularly, the color of the light, emitted from the light-emitting source 10, can be arbitrarily set, and the setting can be made, taking the brightness and the saving of the energy into consideration.

The devices, provided respectively in the sills, the rear bumper 5, 7, and the side steps 6, operate in the same manner as described above.

Although the light-emitting source 10 of this embodiment comprises the photoconductive plate 100, formed of a transparent synthetic resin plate, and the LED lamps 12 and 14 (each molded into a plate-like shape) provided respectively at the opposite ends of the plate 100, the present invention can be carried out even if only one of the LED lamp 12 and the LED lamp 14 is used. Also, it is only necessary to be able to illuminate the ground, and therefore the length and presence of the photoconductive plate 100 do not matter. Particularly, the photoconductive plate 100 can be replaced by a convex lens, or may be replaced by a molded structure formed by molding a transparent or translucent synthetic resin merely into a cylindrical, a cubic or a rectangular parallelepiped shape. Namely, for carrying out the present invention, it is only necessary that the light-emitting source 10 can provide a predetermined spread of light between the position of the vehicle 1A, 1B, at which the light-emitting source is mounted, to the ground.

However, if the length of the photoconductive plate 100 is increased in a specified direction as in this embodiment, the light source has an increased length, so that the area of spread of the light is large. Particularly, since the light is received from the two surfaces, the light can be easily taken out of the light source.

In the construction in which the light-emitting source 10A, 10D is embedded in that portion disposed below the front and rear doors 2 and 3 as shown in FIGS. 1 and 2, those portions of the ground, disposed respectively below the front and rear doors 2 and 3, can be illuminated at the same time, and therefore it is only necessary to provide one light-emitting source at each of the right and left sides of the vehicle 1A, 1B, and the cost can be reduced.

The pulse pattern generator 31 is provided in order to meet the recognition properties of the naked eyes of the user in view of the amount of consumption of electric power, outputted from the light-emitting source 10, and the illumination effect. However, for carrying out the present invention, the provision of the pulse pattern generator 31 may be omitted, in which case the output of the receiver 30 is fed directly as direct current so that the continuous light can be recognized by the naked eyes.

Figure 8:
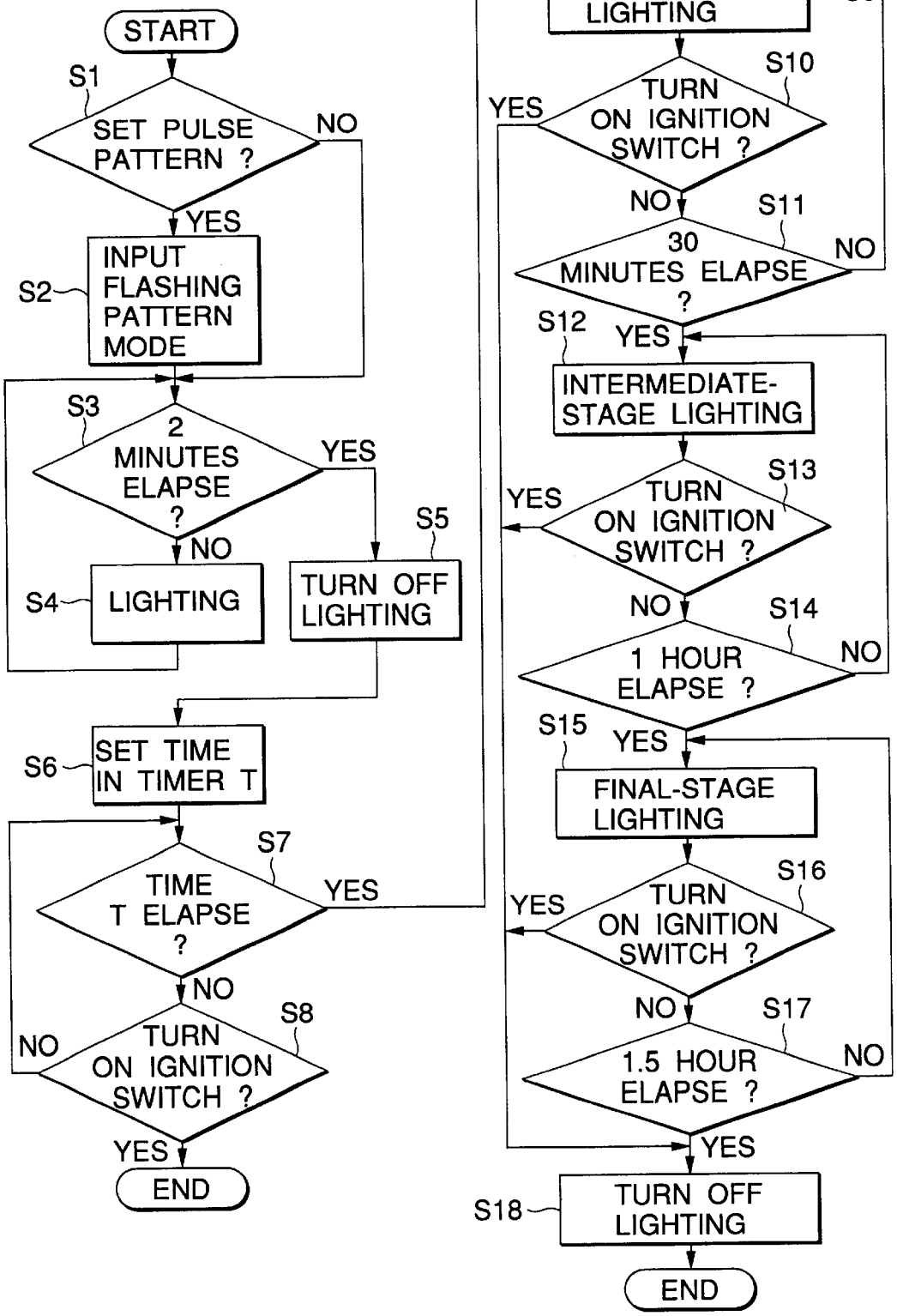
FIG. 8 is a flow chart of the control used for the second embodiment of the vehicle exterior lamp of the invention.

FIG. 7 is a circuit diagram showing an overall construction of a second embodiment of a vehicle exterior lamp of the invention, and FIG. 8 is a flow chart of the control used for the second embodiment of the vehicle exterior lamp of the invention.

A control circuit 40, serving as a timing control circuit in this embodiment, comprises a microcomputer, and a signal of ten keys (from an independent transmitter) and a signal of an ignition key (from a transmitter installed in a vehicle) are inputted into this control circuit. Outputs of the control circuit 40 are fed respectively through a driver 41R, a driver 41G and a driver 41B to three independent circuits (that is, a circuit of a train of red LED chips 43R connected in series with a variable resistor 42R, a circuit of a train of green LED chips 43G connected in series with a variable resistor 42G, and a circuit of a train of blue LED chips 43B connected in series with a variable resistor 42B) connected in parallel. In this embodiment, although not shown in the drawings, the red LED chips 43R, the green LED chips 43G and the blue LED chips 43B are arranged in this order in a direction of a length of a photoconductive plate 100. The intensity of light, emitted from the red LED chips 43R, is determined by varying the resistance value of the variable resistor 42R, and the intensity of light, emitted from the green LED chips 43G, is determined by varying the resistance value of the variable resistor 42G, and the intensity of light, emitted from the blue LED chips 43B, is determined by varying the resistance value of the variable resistor 42B. With this construction, the emitted light can be arbitrarily set to a color, containing a white color, as a whole. In this embodiment, however, since pulse patterns, outputted from the control circuit 40, can be fed respectively to the three independent circuits (that is, the circuit of the red LED chips 43R, the circuit of the green LED chips 43G and the circuit of the blue LED chips 43B) through the respective drivers 41R, 41G and 41B, the variable resistors 42R, 42G and 42B can be fixed resistors, and the color can be adjusted only by the pulse patterns outputted from the control circuit 40.

The vehicle exterior lamp of this embodiment can be used in the following manner as shown in FIG. 8.

First, the processing of this program is started by turning off an ignition switch. In Step S1, it is judged whether or not the pulse patterns to be fed respectively to the three independent circuits (that is, the circuit of the red LED chips 43R, the circuit of the green LED chips 43G and the circuit of the blue LED chips 43B) are set. If necessary, the pulse patterns are set by "*" in the ten keys, and in Step S2, a flashing pattern mode (which is selected from predetermined pulse patterns prepared beforehand, as shown in FIGS. 6A to 6C) is inputted. In this flashing pattern mode, the light flashes in such a manner that the illuminated state (which appears stable to the naked eyes) is obtained at the frequency of the repeated pulses.

Then, in order to allow time to get off the vehicle, the lapse of two minutes is judged in Step S3, and if 2 minutes has not elapsed, the lamp is lighted in Step S4. On the other hand, when 2 minutes elapses, the light is turned off in Step S5. Namely, before the passenger gets off the vehicle, the ground in the vicinity of the vehicle is illuminated. Particularly, the setting of Step S2 is not usually effected, and therefore the light-emitting source 10 is lighted when the ignition switch is turned on.

Then, in Step S6, by the ten keys, an time interval is set in a timer T of four figures. The hour is represented by two digits, and the minute is represented by two digits (One example is 10 hours and 20 minutes). For setting the date, the date can be represented by two digits if 6 digits are set after "#" in the ten keys. The time interval is set in the timer T, and the timer T is started. If the time interval, set in the timer T, has not elapsed (Step S7), it is judged in Step S8 whether or not the ignition switch is turned on, and when the ignition switch is turned on, this routine processing is finished. This routine processing continues unless the ignition key is turned on. Although detailed description is omitted here, there can be provided a processing function in which by repeatedly operating a specified key (for example, "#") twice, the time interval, used in the preceding processing, can be again set.

If the lapse of the time interval, set in the timer T, is confirmed in Step S7, the first-stage lighting is started in Step S9. Bright illumination is provided by this first-stage lighting. If it is judged in Step S10 that the ignition switch is not turned on, this lighted condition is maintained until 30 minutes elapses (Step S11). Namely, the routine from Step S9 to Step S11 is repeatedly executed. When the driver returns to the vehicle, and it is judged in Step S11 that the ignition switch is turned on, the lighting is stopped in Step S18, and this routine is finished.

If the time interval, set in the timer T, has elapsed (Step S7), and thereafter the lapse of 30 minutes is confirmed in Step S11, the intermediate-stage lighting is started in Step S12. In this intermediate-stage lighting, the illumination is effected using the energy (required for illuminating the ground to such a degree that it can be easily recognized) slightly smaller than that used in Step S9, and by doing so, the amount of consumption of electric power, used for the illumination, is reduced. If it is judged in Step S13 that the ignition switch is not turned on, this lighting is repeated until one hour elapses (Step S14). Namely, the routine from Step S12 to step S14 is repeatedly executed. When it is judged in Step S13 that the ignition switch is turned on, the light is turned off in Step S18, and this routine is finished.

If the lapse of one hour is confirmed in Step S14, the final-stage lighting is started in Step S15. In this final-stage lighting, the energy, required for illuminating the ground to such a degree that it can be easily recognized, is set to a minimum, and the illumination is effected, with the consumption of electric power reduced as much as possible. If it is judged in Step S16 that the ignition switch is not turned on, this lighting is repeated until one hour and 30 minutes elapse (Step S17). Namely, the routine from Step S15 to step S17 is repeatedly executed. When it is judged in Step S16 that the ignition switch is turned on, the light is turned off in Step S18, and this routine is finished.

Although it is judged in Step S10, Steps S13 and Step 16 whether or not the ignition switch is turned on, this judgment can be replaced by a judgment as to whether or not a shift lever is shifted from the P range, or whether or not the door is opened and then closed.

In this embodiment, although the control circuit 40 comprises the microcomputer, a timer can be used for carrying out the present invention. However, when the microcomputer is used as the control circuit 40, more kinds of pulse patterns can be produced, and besides the control of production of the pulse patterns is easy.

As described above, the vehicle 1A, 1B is parked at a predetermined position of a parking lot, a road or the like, and when leaving the vehicle 1A, 1B, a time interval, required for finishing the necessary business such as shopping or for finishing the necessary business and returning to the vehicle, is set in the timer T. The control circuit 40, serving as the timing control circuit, measures the lapse of time. More specifically, based on the set time (the time interval set in the timer T), the lapse of 30 minutes, the lapse of 1 hour and the lapse of 1.5 hour are measured. Before 30 minutes elapses after the time set in the timer T, the first-stage lighting is effected to brightly illuminate the surroundings of the vehicle 1A, 1B so that the vicinities of the vehicle 1A, 1B can be quite easily recognized. During the time period from 30 minutes to 1 hour after the time set in the timer T, the intermediate-stage lighting is effected so that the vicinities of the vehicle 1A, 1B can be recognized, thus effecting the control in which the electric power is saved. During the time period from 1 hour to 1.5 hour after the time set in the timer T, the final-stage lighting is effected using the minimum energy, which enables the easy recognition of the vicinities of the vehicle, thus effecting the control in which the electric power is saved as much as possible. When 1.5 hour elapses, this control is finished, judging that the return time is changed, or the set time is wrong. At this time, the predetermined pulse patterns, outputted from the control circuit 40, can set the red LED chips 43R, the green LED chips 43G and the blue LED chips 43B respectively to desired illuminated conditions through electric currents set respectively by the variable resistors 42R, 42G and 42B, and therefore the illumination of the vehicle 1A, 1B can be made different from that of other vehicles so that the vehicle 1A, 1B can be easily found even in a large parking lot.

The light-emitting source 10 of the first embodiment comprises the red LED chips 12R and 14R, the green LED chips 12G and 14G, the blue LED chips 12B and 14B and the serial resistors such as the variable resistors, and the light-emitting source 10 of the second embodiment comprises the red LED chips 43R, the green LED chips 43G, the blue LED chips 43G and the serial resistors such as the variable resistors. However, for carrying out the present invention, the provision of the serial resistors can be omitted if a constant-current circuit is provided.

The red LED chips 43R, the green LED chips 43G and the blue LED chips 43B of the light-emitting source 10 of the above embodiment use three primary colors, respectively, but for carrying out the present invention, it is only necessary that the arbitrary illumination can be effected. The light-emitting source 10 may comprise ordinary lamps having a filament, but if the LEDs are used, the consumption of the energy is small. When the red LED chips 43R, the green LED chips 43G and the blue LED chips 43B of the light-emitting source 10 use the three primary colors, respectively, an arbitrary color, containing a white color, can be produced, and a color, matching with the sense of man, can be selected.

In the above embodiments, although the light-emitting sources 10 are mounted at the exterior of the vehicle, they can be mounted at the interior of the vehicle. Also, the light-emitting source may be mounted on a tip of an antenna, a fender marker and so on. Namely, the present invention can be carried out in so far as the light-emitting source is mounted at such a position as to illuminate the surface of the road.

As described above, the vehicle exterior lamp of the above embodiment comprises the light-emitting source 10, mounted on the vehicle 1A, 1B for illuminating the ground from the vehicle 1A, 1B, the transmitter 20 for outputting the predetermined electromagnetic waves, and the receiver 30 responsive to the electromagnetic waves from the transmitter 20 so as to drive and control the light-emitting source 10.

Therefore, when coming back to a predetermined position of a parking lot, a road or the like where the vehicle 1A, 1B has been parked, the switch of the transmitter 20 is operated, so that the vehicle 1A, 1B is illuminated in the predetermined color and the selected mode, and therefore the vicinity of the door of the vehicle is illuminated by this light so that the condition of the ground can be confirmed. Particularly, the color of the light, emitted from the light-emitting source 10, can be arbitrarily set, and this setting can be made in view of the brightness and the saving of the energy. Even if any discriminating ability, such as a code, is not provided between the transmitter 20 and the receiver 30, the color of the illumination of the vehicle 1A, 1B can be discriminated from that of other vehicles.

Of course, if a personal handy phone system (PHS) is used as the transmitter 20 for outputting the predetermined electromagnetic waves, the required code can be set without the need for preparing a transmitter for exclusive use, and besides other functions can be provided. When a PHS is used as the transmitter 20 for outputting the predetermined electromagnetic waves, the time (time interval) can be set through the PHS of the transmitter 20, using the first and second embodiment in combination, if a PHS or a PHS-receiving ability is provided on the receiver 30. Also, the device can be used without using a transmitter of exclusive use, and the time (time interval) can be set. If a transmitter of a keyless entry system is used as the transmitter 20 for outputting the predetermined electromagnetic waves, the required code can be set without the need for preparing a transmitter of exclusive use, and immediately when the key is unlocked, the illumination can be effected.

The vehicle exterior lamp of the above embodiment comprises the light-emitting source 10, mounted on the vehicle 1A, 1B for illuminating the ground from the vehicle 1A, 1B, and the timing control circuit (comprising the control circuit 40) for changing the color of the light, emitted from the light-emitting source 10, with the lapse of predetermined time.

Therefore, the driver parks the vehicle 1A, 1B at a predetermined position of a parking lot, and a parking time, required for finishing the necessary business such as shopping or for returning to the vehicle, is set or inputted in the timing control circuit (comprising the control circuit 40) when he parks the vehicle. By doing so, upon lapse of the set time, the light-emitting source begins to illuminate, and besides the timing control circuit (comprising the control circuit 40) can set the mode which enables the easy recognition of the vehicle 1 while taking the amount of consumption of the electric power into consideration. Therefore, upon lapse of the predetermined time, the vehicle is illuminated in the predetermined color and the selected mode, and therefore the position of the vehicle can be confirmed by this color.

The light-emitting source 10 of the first embodiment, which is mounted on the vehicle 1A, 1B for illuminating the ground from the vehicle 1A, 1B, comprises the circuit constituted by the circuit of the LED lamp 12 and the circuit of the LED lamp 14 which are connected in parallel, and the circuit of the LED lamp 12 comprises the three independent LED chip circuits (that is, the circuit of one or more red LED chips 12R connected to the variable resistor 11R, the circuit of one or more green LED chips 12G connected to the variable resistor 11G, and the circuit of one or more blue LED chips 12B connected to the variable resistor 11B) connected in parallel, and the circuit of the LED lamp 14 comprises the three independent LED chip circuits (that is, the circuit of one or more red LED chips 14R connected to the variable resistor 13R, the circuit of one or more green LED chips 14G connected to the variable resistor 13G, and the circuit of one or more blue LED chips 14B connected to the variable resistor 11G) connected in parallel. In the light-emitting source 10 of the second embodiment, electric currents, set respectively by the variable resistors 42R, 42G and 42B, are fed respectively to the red LED chips 43R, the green LED chips 43G and the blue LED chips 43B. However, for carrying the present invention, the serial resistors can be replaced by fixed resistances or low-current sources. Each of the LED chips can be replaced by a LED lamp, and the three primary colors can be replaced by a single color, or two-or more colors.

As described above, the vehicle exterior lamp comprises the light-emitting source, mounted on the vehicle for illuminating the ground from the vehicle, the transmitter for outputting the predetermined electromagnetic waves, and the receiver responsive to the electromagnetic waves from the transmitter so as to drive and control the light-emitting source. Therefore, when coming back to a predetermined position of a parking lot, a road or the like where the vehicle has been parked, the light-emitting source on the vehicle is illuminated in the predetermined color by the transmitter, and the vicinity of the door of the vehicle is illuminated by this light so that the condition of the ground can be confirmed.

In the vehicle exterior lamp, the transmitter for outputting the predetermined electromagnetic waves is a personal handy phone system (PHS), and therefore in addition to the above effects, the required code can be set without the need for preparing a transmitter of exclusive use, and besides a mistake in the selection of the vehicle is less, and the light-emitting source of the selected vehicle can be controlled easily.

In the vehicle exterior lamp, the transmitter for outputting the predetermined electromagnetic waves is a transmitter of a keyless entry system, and therefore in addition to the above effects, the required code can be set without the need for preparing a transmitter of exclusive use, and simultaneously when the key is unlocked, the illumination can be effected.

Further, the vehicle exterior lamp comprises the light-emitting source, mounted on the vehicle for illuminating the ground from the vehicle, and the timing control circuit for changing the color of the light, emitted from the light-emitting source, with the lapse of predetermined time. Therefore, the driver parks the vehicle at a predetermined position, and a parking time required for finishing the necessary business or for returning to the vehicle, is set or inputted in the timing control circuit when he parks the vehicle. By doing so, upon lapse of the set time, the light-emitting source begins to illuminate so that the ground in the vicinity of the vehicle can be easily recognized, and besides the timing control circuit can set the mode which enables the easy recognition of the vehicle while taking the amount of consumption of the electric power into consideration. Upon lapse of the predetermined time, the vehicle is illuminated in the predetermined color, and therefore the position of the vehicle can be confirmed by this color.

In the vehicle exterior lamp, the light-emitting source comprises light-emitting diodes, and therefore in addition to the above effects, the amount of consumption of electric power is reduced, and besides even if the period of lighting is shortened, its response is high, and therefore the degree of freedom of the recognizable color can be increased.

What is claimed is:

1. A vehicle exterior lamp comprising:
   a light-emitting source mounted on a vehicle, the source being configured to emit light for illuminating a ground location from said vehicle;
   a transmitter for outputting predetermined electromagnetic waves; and
   a receiver responsive to said predetermined electromagnetic waves and adapted to drive and control said light-emitting source based upon said predetermined electromagnetic waves;
   wherein, when said predetermined electromagnetic waves indicative of operation of at least one from the set including: a keyless entry system and a door lock motor, are received at said receiver, said light-emitting source produces a responsive light output for a predetermined time period, the responsive light output having a color different from an ordinary light used when one within said at least one set is not operated; and
   wherein, when a door of the vehicle is opened, said light-emitting source produces an alternative light having a color different from said ordinary light and different from the responsive light output associated with said at least one set.

2. A vehicle exterior lamp according to claim 1, wherein said transmitter is a portable wireless device.

3. A vehicle exterior lamp according to claim 1, wherein said transmitter for outputting said predetermined electromagnetic waves is a transmitter of a keyless entry system.

4. A vehicle exterior lamp according to claim 1, wherein said light-emitting source comprises a light-emitting diode.

5. A vehicle exterior lamp comprising:
   a light-emitting source mounted on a vehicle, the source being configured to emit light for illuminating a ground location from said vehicle; and
   a timing control circuit adapted to change a color of the emitted light;
   wherein the color is changed based upon at least one of the following: lapse of a predetermined time period, operation of a keyless entry system, and operation of a door lock motor.

6. A vehicle exterior lamp according to claim 5, wherein said light-emitting source comprises a light-emitting diode.

* * * * *